Figure 1:
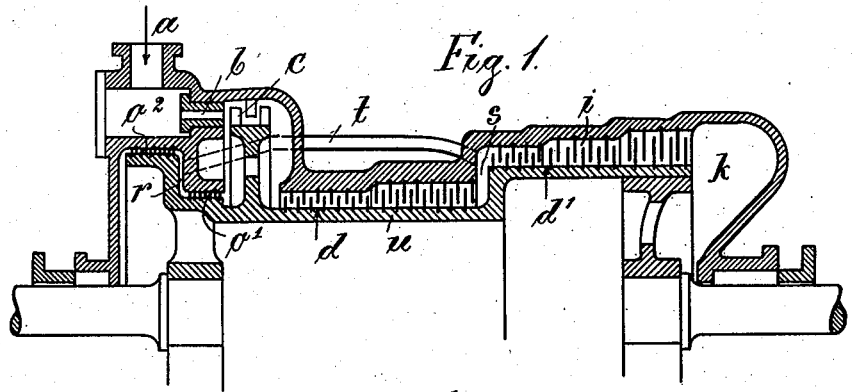

C. ROTH.
TURBINE.
APPLICATION FILED JUNE 11, 1908.

911,616.

Patented Feb. 9, 1909.
4 SHEETS—SHEET 1.

Witnesses:
Paul Hinkelmann.
Arthur Scholz.

Inventor:
Carl Roth
by: Richard Eisler
Attorney.

C. ROTH.
TURBINE.
APPLICATION FILED JUNE 11, 1908.

911,616.

Patented Feb. 9, 1909.
4 SHEETS—SHEET 3.

Witnesses:
Arthur Scholz
Paul Hinkelmann.

Inventor:
Carl Roth
by
Attorney

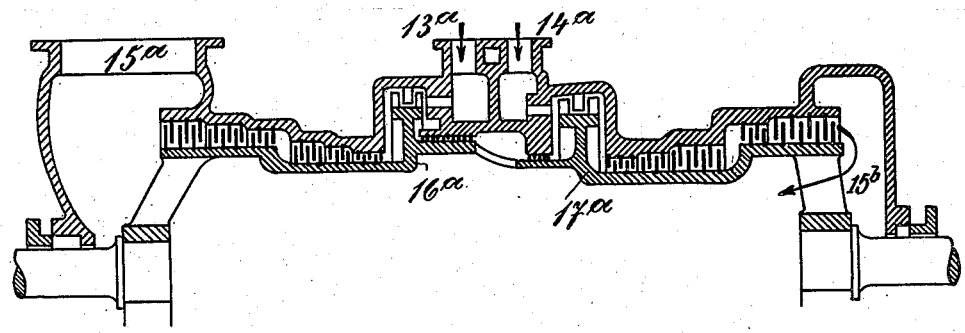
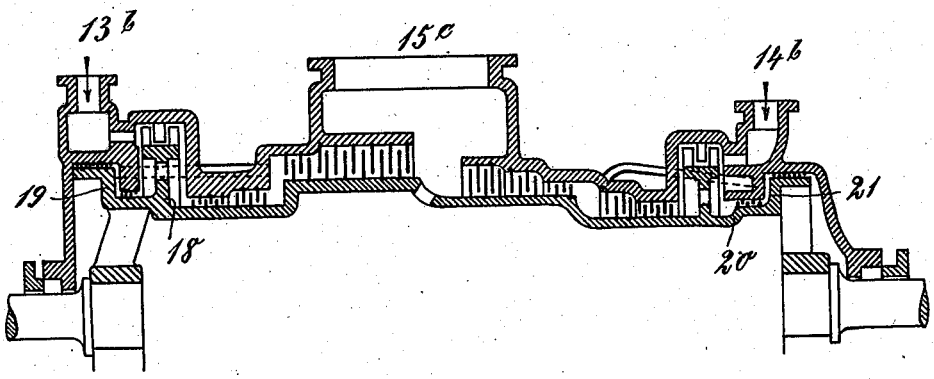

UNITED STATES PATENT OFFICE.

CARL ROTH, OF ZEHLENDORF, NEAR BERLIN, GERMANY.

TURBINE.

No. 911,816.

Specification of Letters Patent.

Patented Feb. 9, 1909.

Application filed June 11, 1908. Serial No. 437,943.

*To all whom it may concern:*

Be it known that I, CARL ROTH, a citizen of the Confederation of Switzerland, and resident of 9 Annastrasse, Zehlendorf, near Berlin, Kingdom of Prussia, German Empire, have invented certain new and useful Improvements in Means for Balancing the End Pressure in Turbines, of which the following is an exact specification.

This invention relates to the means used for balancing the end pressures in turbines composed wholly or partly of the pressure flow type. In such turbines it has already been proposed to effect the balancing by means of balancing pistons subjected only to a part of the total pressure fall in the turbine. The pressure difference exerted on the balancing surface was maintained by means of labyrinth packing which was of course not subjected to the total pressure drop in the turbine and thereby losses through friction and leakage were to some extent avoided. In arranging the balancing surface in this way however many difficulties arise. Thus it is impossible when balancing the whole end pressure of a turbine on a single balancing surface in the manner above described to calculate the amount of pressure fall and the necessary surface so as to meet all conditions.

In all turbines in which pressure flow parts are employed and arranged on a drum of different diameters the pressure differences in the various parts are not always in the same proportion to the pressure which is exerted on the balancing surface. These differences in the proportion cause end pressures which of course in the case of large diameter turbines introduce very serious loads as even small unbalanced pressures become of very serious importance in the case of such large turbines because these small pressure differences create end pressures increasing with the square of the diameter of the turbine. Again assume the case of a turbine composed of two co-axial parts and arranged to work either with or without condensation and that the pressure fall in the first part be employed for obtaining the end balancing pressure. In this case if the conditions are arranged as accurately as possible by calculation so that the single end pressure balancing surface operates efficiently with condensation, these conditions will not hold good when working without condensation. Thus it is practically impossible with a single end pressure balancing surface to so select the pressure fall acting on the balancing surface and the area of the balancing surface that with overloading and under all the various conditions of working the balancing pressure will be automatically regulated and equal to the end pressure of the turbine.

The present invention has for its object to avoid the objections mentioned above and to provide an arrangement by which an automatic regulation of the balancing pressure will be secured under all conditions of working while at the same time the various labyrinth packings are only subjected to a fraction of the total pressure fall in the turbine.

To this end the invention consists in providing the turbine with a plurality of balancing dummy pistons subjected to different end pressures the highest pressure piston being subjected to an end pressure equal only to a part of the pressure fall in the turbine and a plurality of banks of labyrinth packing for maintaining the pressure differences between the different balancing surfaces and the total pressure difference being employed for end pressure balancing. The highest pressure dummy balancing piston is connected to a point intermediate in the expansion of the steam in the turbine. Thus the first expansion stage may take place in a velocity flow turbine or in a pressure flow turbine as hereinafter described with reference to the drawings. The labyrinth packings may be arranged in various positions thus they may be arranged in steps or stagewise at the high pressure or low pressure end of the turbine or they may be distributed over both these ends.

The invention is illustrated by way of example in several modifications.

Figure 2:
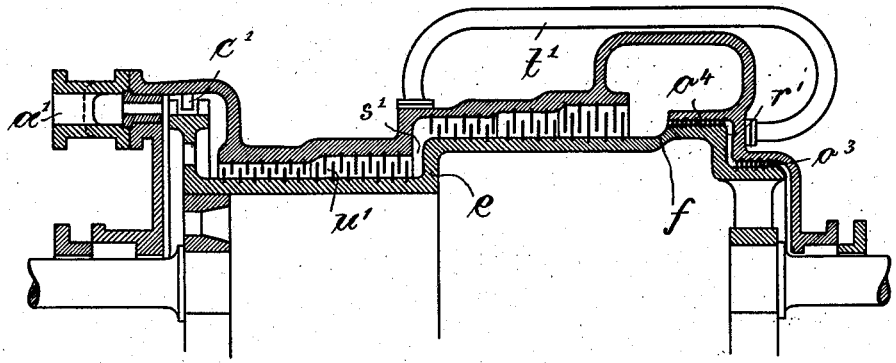
Figure 3:
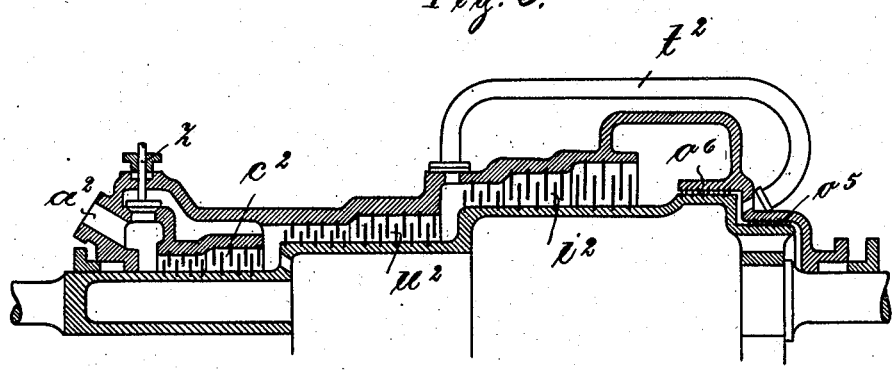
Figure 4:
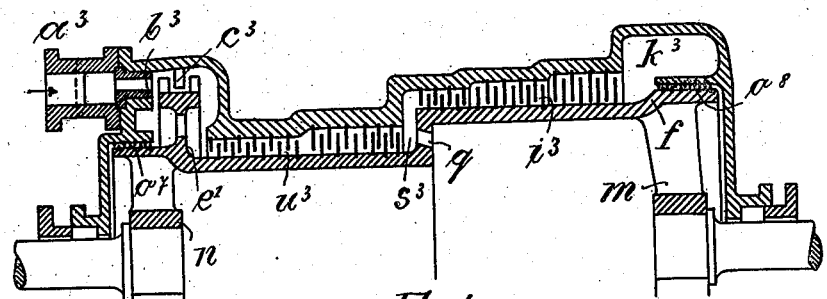
Figure 5:
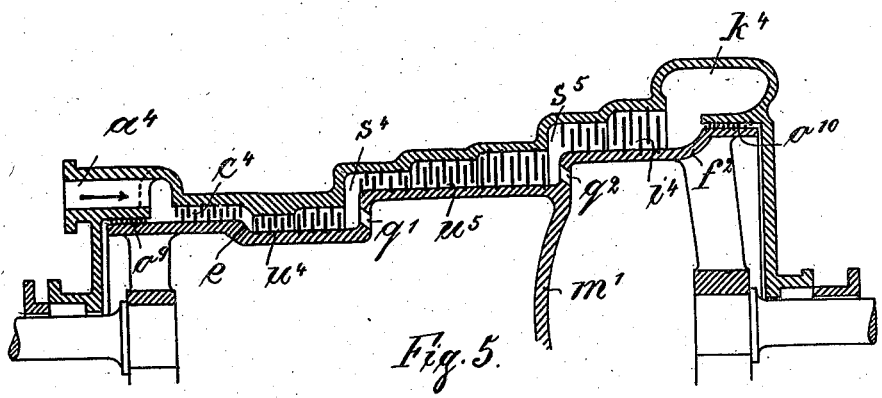
Figure 10:
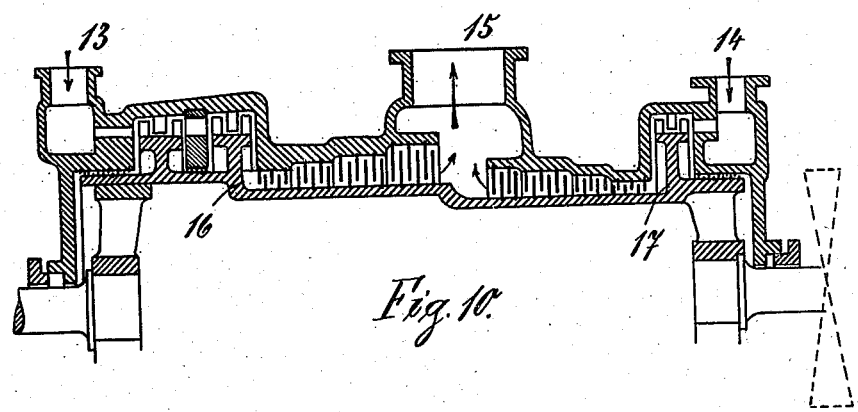

Figure 1 is a partial cross section through a turbine diagrammatically illustrating the present invention, Fig. 2 is a view similar to Fig. 1 showing a different arrangement of the labyrinth packings, Fig. 3 illustrates a form of the invention similar to Fig. 2 as applied to a turbine composed wholly of pressure flow parts, Fig. 4 is a view similar to Fig. 1 showing an arrangement in which one of the labyrinth packings is arranged at the high pressure end and the other at the low pressure end, Fig. 5 is a view similar to Fig. 1 and showing an arrangement of the labyrinth packings as illustrated in Fig. 4 but applied to a different kind of turbine, Figs. 6, 7, 8 and 9 are detail views of suitable packing arrangements for the blades, Fig. 10 is a partial cross section through the casing of a turbine in which a forward and reversing turbine are arranged within one casing, the balancing surfaces and labyrinth packings being arranged according to the present invention, Fig. 11 illustrates a modified arrangement of forward and reversing turbine with a modified arrangement of the labyrinth packings. Fig. 12 is a view similar to Fig. 11 and illustrates another modified form of reversing and forward turbine in one casing.

In Fig. 1 there is illustrated a balancing arrangement in which each pressure flow part is provided with a balancing surface. The part $u$ of the diameter $d$ is balanced by the annular surface between the labyrinth packing $o'$ and the diameter $d$. The part of the diameter $d'$ is balanced by means of the annular surface between the labyrinth packing $o'$ and the labyrinth packing $o^2$. At the step from the diameter $d$ to the diameter $d'$ there is arranged a connection $t$ leading to the space $r$ between the labyrinth packing $o'$ and the labyrinth packing $o^2$. The operation of this device is as follows: Steam enters by the pipe $a$ through a nozzle $b$ and impinges on the velocity flow turbine $c$. The steam then passes through the first stage $u$ of the pressure flow turbine to the chamber $s$ and then through the second stage $i$ of the pressure flow turbine to the exhaust pipe $k$. The ends of the drum open to the exhaust space $k$ so that the dummy pistons at the high pressure end of the turbine are subjected on one side to the condenser pressure. The dummy piston or end balancing face arranged between the diameter $d$ and the labyrinth $o'$ is subjected to the pressure difference between the entrance side of the pressure stage $u$ and the exhaust $k$. This end pressure is sufficient to balance the end forces in the part $u$. The balancing surface arranged between the labyrinth packing $o'$ and the labyrinth packing $o^2$ is subjected to the pressure difference existing between the chamber $s$ and the condenser or exhaust pipe $k$. Thus the automatic regulation of the balancing pressure is divided over the two balancing faces referred to, so that the different parts of the turbine $o$ and $i$ are separately balanced and the amount of the total balancing force will in all cases be suited to the different conditions of working. Further this result is secured without subjecting the labyrinth packings contained in the banks or sets $o'$ and $o^2$ to large pressure drops. The labyrinth packing $o'$ has only to preserve the pressure difference between the entrance side of the turbine part $u$ and the chamber $s$ while the labyrinth packing $o^2$ has only to preserve the pressure difference existing between the chamber $s$ and the condenser or exhaust $k$.

In Fig. 2 an arrangement of the labyrinth packing somewhat different from that shown in Fig. 1 is illustrated. In this form both the labyrinth packings $o^3$ and $o^4$ are arranged at the low pressure end of the casing instead of the high pressure end. In this case steam enters by the pipe $a'$ and passes through the velocity stage $c'$ to the first pressure flow stage $u$. The pressure of steam at the entrance side of the high pressure stage $u$ is transmitted to the interior of the turbine drum as can be understood from Fig. 2. The space $s'$ is connected by a pipe $t'$ to the space $r'$ between the packing $o^3$ and the packing $o^4$. The balancing end pressure in this case also is exerted on the annular surfaces $e$ and $f$. Also the packings $o^3$ and $o^4$ are only subjected to comparatively small pressure drops.

In Fig. 3 the invention is illustrated as applied to a turbine in which the first stage is carried out in a pressure flow turbine $c^2$ instead of the velocity stage turbine $c'$. In Fig. 3 the valve $z$ is the overload valve by which steam may be passed directly from the inlet $a^2$ to the entrance side of the turbine $u$. The arrangement of the parts $u^2$ and $i^2$, the tube $t^2$ are similar to those illustrated in Fig. 2. The labyrinth packings $o^5$ and $o^6$ in this case are also arranged as described with reference to Fig. 2.

In carrying the invention into effect according to the form shown in Fig. 4 steam enters by a pipe $a^3$ and passes through a nozzle $b^3$ into a velocity flow stage $c^3$ and then passes through the pressure flow stage $u^3$ to a chamber $s^3$. The chamber $s^3$ may be placed in communication with the interior of the drum by means of an opening $q$. The steam from the chamber $s^3$ passes through the low pressure stage $i^3$ into the exhaust $k^3$. The ends $m$ and $n$ of the turbine drum are open. The labyrinth packing of smaller diameter $o^7$ is arranged at the high pressure end and the labyrinth packing $o^8$ of larger diameter is arranged at the low pressure end. The end balancing surfaces $e'$ and $f'$ are arranged the former at the high pressure end and the latter at the low pressure end of the drum. Thus in this case it will be seen that a plurality of end balancing faces are provided while at the same time a corresponding plurality of labyrinth packings are only subjected to comparatively small pressure falls.

Figure 6:
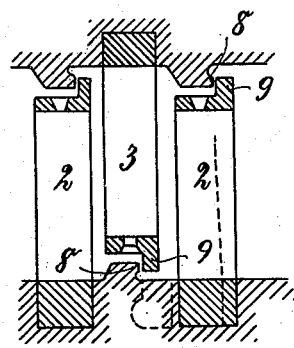
Figure 7:
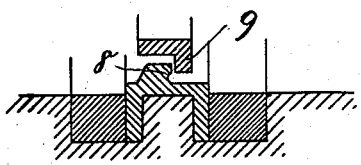

In Fig. 5 the arrangement is somewhat modified and shown as applied to a turbine in which the first stage $c^4$ is of the multi-stage velocity flow type. Steam entering by the pipe $a^4$ passes through the velocity stages $c^4$ to a chamber $s^4$ and then through one stage $u^4$ to a further annular chamber $s^5$ and then through the last stage $i^4$ to the exhaust chamber $k^4$. The labyrinth packing of smaller diameter $o^9$ is of the same diameter as the velocity stage part $c^4$ and the annular surface $e^3$ forms the end balancing surface for the high pressure part of the turbine. The annular surface $f^2$ between the labyrinth packing $o^{10}$ and the largest diameter of the turbine drum forms a second end balancing surface. The chambers $s^4$ and $s^5$ are connected by openings $q'$ and $q^3$ respectively with the interior of the turbine drum. The turbine drum is however divided by a wall $m'$ into two parts so that in the chamber to the right of $m^1$ the pressure of the chamber $s^5$ exists while in the chamber to the left of $m'$ the pressure of the chamber $s^4$ exists. The operation of this device is in principle the same as those already described. An enlarged view of the blading and packing for these blades as employed in the turbines herein described is illustrated in Fig. 6. The moving blades 2 of the turbine and the fixed blades 3 are provided with projecting ledges 9 which co-act with ledges 8 formed in the drum or casing. In Fig. 6 the ledges 9 are shown as riveted by pins to the blades. They may however be formed with the blades as shown in Fig. 7 and the ledges 8 may be carried by insertion pieces as shown in Fig. 7. Hitherto the blade packings were formed as shown in dotted lines in Fig. 6 that is to say the blades engaged in recessed parts in the drum or casing. The arrangement involved a considerable lengthening of the turbine causing thereby a serious disadvantage in the case of large multi-stage turbines. By providing the packing faces on projecting parts 8 co-acting with ledges in the manner described this disadvantage however is avoided.

Figure 8:
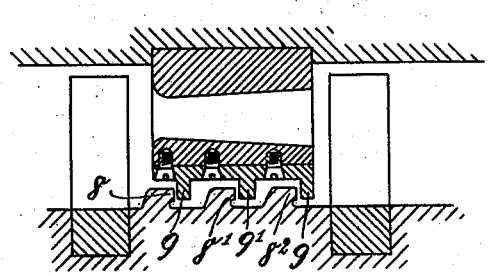
Figure 9:
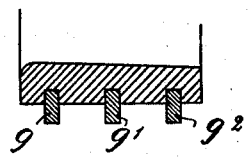

In Fig. 8 there is illustrated a form of packing suitable for use with the fixed nozzles in velocity stage turbines. In this case several projections 9' and $9^2$ are arranged on the fixed nozzles to co-act with projections 8, 8' and $8^2$ on the rotating drum. In Fig. 8 the projections 9, 9' and $9^2$ are shown as arranged on a blade fixed to the nozzle casting 3. These projections however may be arranged as shown in Fig. 9, in which separate rings are embedded in the nozzle casting.

The invention herein described is not only limited to turbines adapted to run in one direction but may also be applied to those forms of turbines in which a forward and reversing turbine are arranged in one casing. In Fig. 10 there is illustrated a form of turbine of this kind in which high pressure steam enters from the ends 13 and 14 and exhausts at the center 15. In this case only a single end balancing face 16 is arranged for the left hand turbine and another single balancing face 17 is arranged for the reversing turbine.

In Fig. 11 the turbine is shown arranged slightly differently that is to say high pressure steam enters at the center by the openings $13^a$ and $14^a$ and exhausts at the ends by the openings $15^a$ and $15^b$. As regards balancing the turbine illustrated in Fig. 11 operates as that illustrated in Fig. 10, the surfaces $16^a$ and $17^a$ being the end balancing surfaces.

According to the form shown in Fig. 12 each turbine is arranged exactly as described with reference to Fig. 1, that is to say, steam enters at the ends $13^b$ and $14^b$ and exhausts at the center $15^c$. The balancing surfaces for the left hand turbine are the faces 18 and 19 and the balancing surfaces for the right hand turbine are the surfaces 20 and 21.

I claim:—

1. In a turbine having several pressure flow parts arranged co-axially, a plurality of balancing dummy pistons subjected to different end pressures the highest pressure piston being subjected to an end pressure equal only to part of the pressure fall in the turbine and a plurality of banks of labyrinth packing for maintaining the pressure differences between the different balancing surfaces and the total pressure difference employed for end balancing.

2. In a turbine having several pressure flow parts arranged co-axially, a plurality of end pressure balancing pistons subjected each to different pressure falls and the highest pressure piston being connected to an intermediate expansion point in the turbine and a plurality of sets of labyrinth packings for preserving the pressure difference on the opposite sides of said dummy pistons.

3. In a turbine having a high pressure velocity flow part and several pressure flow parts arranged co-axially, a plurality of dummy balancing pistons of different diameters and subjected to different end pressures, said pistons being arranged stagewise at one end of the turbine, a connection leading from the space between one stage and the other to an intermediate part of the turbine, a connection from an intermediate part in the expansion of the steam to the highest pressure dummy piston and labyrinth packings arranged between said stages, substantially as described.

4. In a turbine having a high pressure part and several pressure flow parts arranged co-axially on different diameters of drum, a plurality of balancing dummy pistons one for each of the different diameters of drum, the highest pressure dummy piston being connected to an intermediate point in the expansion of the steam and a similar plurality of sets of labyrinth packings maintaining the pressure differences between opposite sides of the various dummy pistons.

5. In a turbine having a high pressure part and several pressure flow parts arranged co-axially on different diameters of drum, a plurality of balancing dummy pistons one for each of the different diameters of drum, the highest pressure dummy piston being connected to an intermediate point in the expansion of the steam, and a similar plurality of sets of labyrinth packings arranged stagewise at one end of the turbine for maintaining the pressure differences between the opposite sides of the various dummy pistons.

6. In a turbine having a high pressure part and several pressure flow parts arranged co-axially on different diameters of drum, a plurality of balancing dummy pistons one for each of the different diameters of drum, the highest pressure dummy piston being connected to an intermediate point in the expansion of steam, and a similar plurality of sets of labyrinth packings arranged stagewise at the high pressure end of the turbine for maintaining the pressure differences between the opposite sides of the various dummy pistons.

7. In a turbine having a high pressure velocity flow part and two pressure flow parts arranged co-axially on two diameters of turbine drum, two balancing dummy pistons arranged stagewise at the high pressure end of the turbine, the smaller dummy piston being in communication with the outlet of the velocity flow part, two sets of labyrinth packings of different diameters arranged one on each side of the second dummy piston and a connection from the space between the two sets of labyrinth packings to the step from the smaller to the larger diameter of drum.

8. In turbines having forward and reversing turbines in one casing, balancing pistons for said forward and reversing turbines, said balancing pistons being subjected to only a part of the pressure fall in the turbine.

9. In turbines having forward and reversing turbines in one casing, a high pressure part and several pressure flow parts arranged co-axially on different diameters of drum in both the forward and reversing turbines, a plurality of balancing dummy pistons in both the forward and reversing turbines one for each of the different diameters of drum in said turbines, the highest pressure dummy pistons being connected to an intermediate point in the expansion of the steam and a similar plurality of sets of labyrinth packings in each of said forward and reversing turbines for maintaining the pressure differences between the opposite sides of the various dummy pistons in said turbines.

In witness whereof I have hereunto set my hand in the presence of two witnesses.

CARL ROTH.

Witnesses:
 ERNST STUNNSKI,
 ELISE FRIESE.